Jan. 10, 1956  C. G. GERHOLD  2,730,558
LIQUID SOLVENT EXTRACTION PROCESS
Filed Aug. 20, 1952
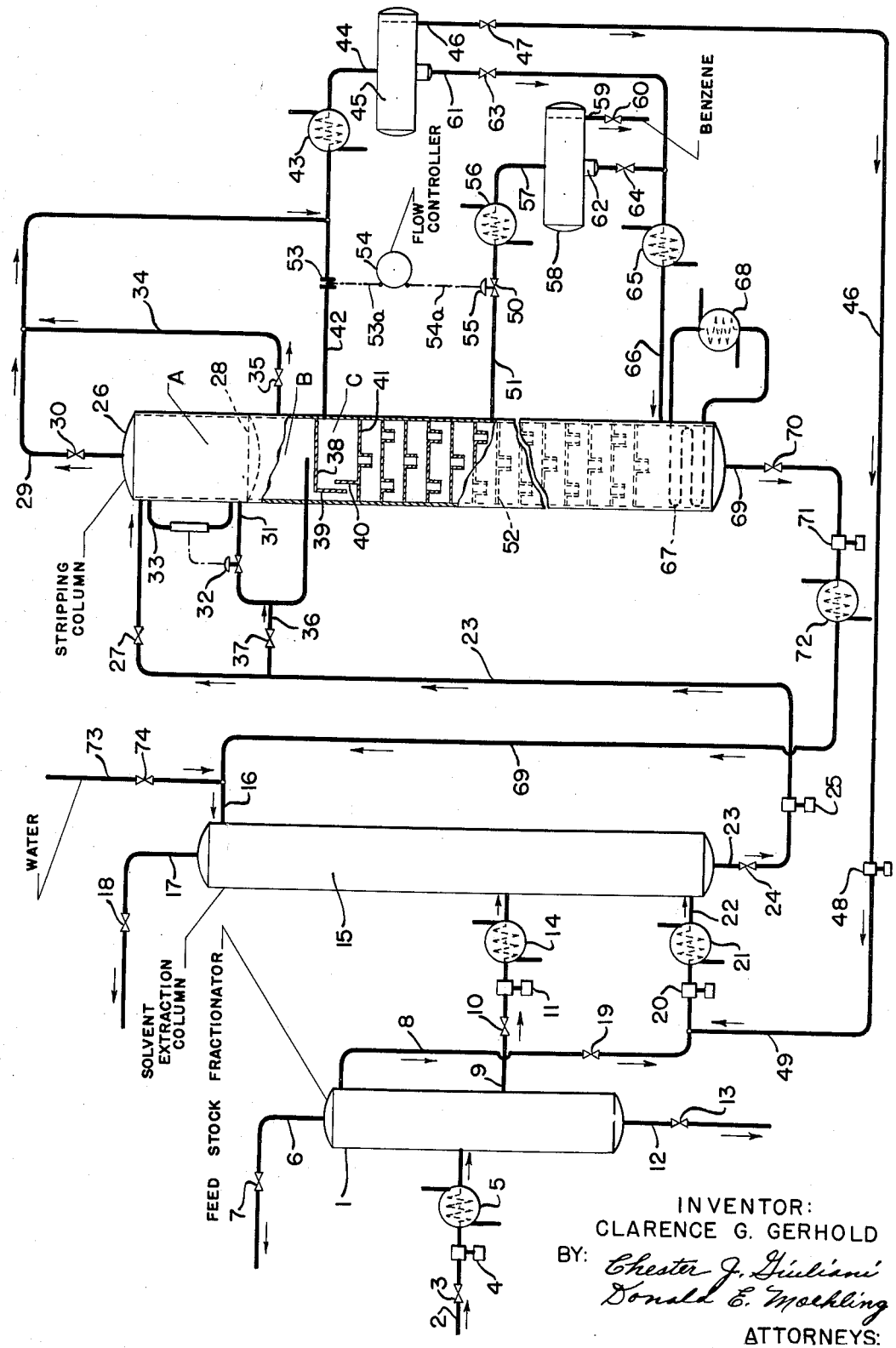
INVENTOR:
CLARENCE G. GERHOLD
BY: Chester J. Giuliani
Donald E. Moehling
ATTORNEYS:

United States Patent Office 2,730,558
Patented Jan. 10, 1956

2,730,558

LIQUID SOLVENT EXTRACTION PROCESS

Clarence G. Gerhold, Riverside, Ill., assignor to Universal Oil Products Company, Chicago, Ill., a corporation of Delaware Application August 20, 1952, Serial No. 305,391

7 Claims. (Cl. 260—674)

This invention relates to a modified and improved method of recovering an extract product from a rich solvent phase formed in a liquid solvent extraction process under conditions whereby the rate of extract removal from the process flow is automatically adjusted to accommodate variations in the concentration of product in the feed stock charged to the process. More specifically, the invention concerns a combination solvent extraction-rich solvent stripping process in which a raffinate-type compound which is relatively volatile in the presence of the solvent with respect to the extracted component is counter-currently contacted with the rich solvent or extract phase formed during the solvent extraction stage to thereby displace raffinate feed stock components from the rich solvent, the resulting rich solvent stream is distilled in a solvent stripping column under conditions whereby the withdrawal rate of the volatile overhead and sidecut fractions from the stripping column are mutually controlled to eliminate excessive removal of the desired product vapor through the overhead take off.

One embodiment of the present invention relates to an improvement in a combination solvent extraction-rich solvent stripping process which comprises contacting an organic solvent under solvent extraction conditions with a feed stock mixture comprising organic compounds of class A and of class B, said A compound being relatively more soluble in said solvent than said compounds of class B, thereby forming a raffinate comprising said class B compound and a rich solvent comprising said organic solvent, said class A compound and a small proportion of class B compound, thereafter contacting said rich solvent with a class C compound which is relatively more volatile in the presence of the solvent than said class B compound under conditions whereby said class B compound is displaced from the rich solvent and replaced with said more volatile class C compound, subjecting the resulting rich solvent to distillation, recovering a light vapor overhead from said distillation comprising said class C compound, recovering a side-cut vapor consisting essentially of said class A compound, and accommodating variations in the concentration of the class A compound in said feed stock mixture by varying the rate of side-cut withdrawal in response to changes in the rate of light vapor overhead withdrawal.

A more specific embodiment of the invention relates to a process for separating and recovering the solute components of a rich solvent formed in a preceding solvent extraction zone by vaporizing said solute components in a distillation zone comprising a combination of an upper flashing section in which a relatively volatile solute component in the presence of the solvent is flashed from said rich solvent supplied thereto and a stripping section below said flashing section which a solute component relatively less volatile in the presence of the solvent than the first-mentioned solute component is stripped from said rich solvent, said process comprising introducing said rich solvent at an elevated temperature in excess of the boiling point of at least the first-mentioned volatile solute component into said flashing section, withdrawing a vapor from the flashing section comprising said first-mentioned volatile solute component, introducing a resulting first rich solvent residue into a vaporizing section of said distillation zone maintained at a lower pressure than said flashing section, withdrawing vapor from said vaporizing section, introducing a resulting second rich solvent residue into said stripping section of the distillation zone having rich solvent heating means in the lower portion thereof, said stripping section being vapor-sealed from said vaporizing section, withdrawing solute vapor from said vaporizing section, withdrawing vapors comprising said first-mentioned solute component from the upper portion of said stripping section at a constant rate, and withdrawing vapors comprising said less volatile solute component from a lower portion of said stripping section at a rate determined by maintaining at a constant rate the withdrawal of solute vapors from said vaporizing section.

This invention is directed to an improvement in the method of recovering the volatile solute or extract components from a rich solvent phase formed in a liquid-liquid solvent extraction process. The process is applicable to a wide variety of feed stocks and solvents, the principle qualifying characteristics of these materials being that the component of the feed stock to be recovered as product in the solvent extraction process be more soluble in the solvent than the undesired raffinate constituents and that the extracted component be more volatile than the solvent. One of the most readily adapted feed stocks to the present solvent extraction process is a mixture of hydrocarbons, such as the mixture occurring in the product a hydrocarbon cracking process, the normally liquid product of a hydrocarbon reforming process (usually containing a relatively high concentration of aromatic hydrocarbons which are recoverable by solvent extraction) or the products of other hydrocarbon conversion process containing a mixture of one or more classes of hydrocarbon compounds therein. In general, the aromatic hydrocarbon components are more soluble in the solvent than are other classes of hydrocarbons, the solubility of various classes of hydrocarbons in most solvents decreasing in the order: aromatics, cyclo-olefins, branched chain olefins, naphthenes, isoparaffins and straight chain paraffins. In the case of other organic compounds, the polar compounds (generally having a dipole moment or containing an electronegative substituent in their molecular structure) are more soluble in solvents than are the non-polar compounds. The process may also be operated to separate two or more different classes of polar organic compounds or soluble hydrocarbons from relatively non-polar constituents of a mixture of organic compounds supplied to the process. For the sake of convenience of expression the feed stock to the present process may be characterized as containing two general types of organic compounds, that is, at least one compound of class A and at least one of class B, said class A compound being characterized as having relatively greater solubility in the solvent than compounds of class B; thus, compounds of class A dissolve more readily in the selective solvent to form the present rich solvent phase and may therefore be extracted from the B compounds which form the present raffinate phase. The particular solvent to be utilized for the extraction of any given organic compound will depend upon the boiling point of the compound to be recovered; in most instances it is preferred that the solvent be relatively non-volatile at the boiling point of the solute contained in the rich solvent formed in the solvent extraction stage, such that the solute component to be recovered may be distilled from the rich solvent without substantial inclusion of solvent vapors. The preferred solvents for use in the present process desirably having boiling points greater than about 150° C. Suitable solvents utilizable herein are usually selected from certain relatively non-volatile oxygen-containing organic compounds, although other classes of organic compounds having selective solvent characteristics which make them suitable as solvent extractants may also be employed in the present process without departure from the essential operating features of the process. Organic oxygen-containing compounds particularly useful as solvents herein are such compounds as the aliphatic and cyclic alcohols containing preferably more than about 6 carbon atoms per molecule, the glycols and glycol ethers (also referred to as the polyalkylene glycols) as well as the glycol esters and glycol ether-esters. Alkylene glycols and polyoxypolyalkylene glycols which are a particularly effective class of selective solvent for the present operation because of their high boiling points include the di-, tri-, and tetra-oxyethylene glycols, particularly oxydiethylene glycol, and the mono-, di-, and di-oxypropylene glycols or mixtures thereof with the polyethylene glycols.

In many applications of the selective solvent extraction process of this invention, it is advantageous to employ a mixture of solvent constituents, one of which boils at a considerably lower temperature than the other constituent, such that the latent heat of vaporization of the volatile solvent component may be utilized to strip from the rich solvent the last residue of solute component or components extracted from the feed stock. Thus, water or a low molecular weight alcohol or alcohol ester may be mixed with the primary solvent constituent as a secondary solvent component and distilled with the dissolved solute components from the stripping column in the product recovery stage of the present process. For this purpose, the relatively volatile secondary solvent constituent such as water or furfural, may be injected into the reboiling section of the stripping column, preferably in vapor form, and at a rate sufficient to effect substantially complete vaporization of the dissolved solute components from the rich solvent residue.

The present solvent extraction process is preferably operated in conjunction with a rich solvent washing stage prior to the stripping operation by contacting (preferably under countercurrent flow) the rich solvent with a reflux stream comprising a relatively volatile raffinate type compound for the removal of the normally small amount of raffinate components of the feed stock mixture which tend to dissolve in small quantities in the solvent stream. The normally small amount of raffinate components present in the rich solvent stream, although of slight solubility in the solvent, nevertheless when compared with the quantity of product component dissolved in the solvent are sufficient soluble to contaminate the recovered product in an amount which substantially reduces the quality of the ultimate product. The raffinate contaminants, since they are dissolved from the feed stock mixture supplied to the process, normally boil at approximately the same temperature as the desired product and usually distill over with the desired product when distilled from the rich solvent. The raffinate contaminants are therefore not separable from the product by simple distillation from the rich solvent and when the product is desired in substantially pure form, the product distilled from the solvent stripping column must be subjected to complicated and expensive purification procedures in order to remove the remaining raffinate contaminants from the product. In accordance with one of the preferred means of operating the solvent extraction process of this invention, the rich solvent stream either before or after removal from the solvent extraction column is contacted, preferably under countercurrent flow conditions, with a reflux stream comprising an organic compound capable of displacing the feed stock raffinate contaminants from the rich solvent phase, the reflux compound having a boiling point which enables it to be readily vaporized from the rich solvent without distilling in any substantial amount the desired product from the rich solvent. One of the preferred classes of compounds utilizable as the displacing agent or reflux stream is a lower molecular weight raffinate-type compound, herein referred to as a compound of type C, which is relatively more volatile in the presence of the solvent than the product component of the rich solvent stream. Thus, in the recovery of benzene from a petroleum fraction comprising a mixture of benzene and paraffinic hydrocarbons, the rich solvent stream containing a mixture of benzene and a small quantity of the paraffinic hydrocarbons originally comprising the feed stock mixture is countercurrently contacted with a low molecular weight paraffinic hydrocarbon, such as a pentane, hexene or heptane isomer in the lower portion of the solvent extraction column or in a separate column where the volatile paraffin hydrocarbon displaces the higher molecular weight paraffins initially present in the feed stock mixture. The extract or rich solvent finally removed from the solvent extraction column or from the auxiliary contacting column after the countercurrent washing procedure then contains a mixture of benzene and the low molecular weight paraffin as the dissolved solute components rather than feed stock paraffinic contaminants boiling above benzene. The paraffin displacing agent may be flashed from the rich solvent in the subsequent rich solvent stripping column and separately recovered from the benzene component which is recovered as a substantially pure side-cut fraction in the stripping operation.

The above and other embodiments of the invention, together with a correlation of the principles upon which the present combination solvent extraction and solvent stripping process operates, is further described in the accompanying diagram which represents the process flow of one of the preferred embodiments of the invention for the separation of a mixture of a relatively soluble class A compound from a less soluble class B organic compound. For the purpose of simplicity, the diagram is described with reference to a feed stock mixture comprising a mixture of hydrocarbons, such as a petroleum fraction containing an aromatic hydrocarbon such as benzene. It is to be emphasized, however, that the process may also be applied to the recovery of other, relatively soluble components of organic feed stock, including other aromatic hydrocarbons either individually or as mixture particularly the light hydrocarbons: benzene, toluene and/or the xylenes. Also for the sake of simplifying the description, a particular solvent comprising a mixture of oxydiethylene glycol and water as the respective primary and secondary solvents is designated as the selective solvent composition and a paraffinic hydrocarbon fraction consisting predominantly of $C_5$ paraffins is utilized as the displacing agent (compound C) to produce a benzene concentrate of nitration grade quality containing 99% benzene.

Referring to the accompanying flow diagram, a petroleum distillate containing $C_4$ light ends and boiling up to about 200° C. is charged into fractionating column 1 through line 2 in amounts controlled by valve 3, the fraction being transferred from storage into line 2 by means of pump 4 through heat exchanger or furnace 5 wherein the fraction is heated to a temperature above the boiling point of the volatile components of the fraction to be separated in fractionating column 1. A light overhead fraction boiling below about 40° C. is removed from fractionating column 1 through vapor overhead conduit 6, containing valve 7 and discharged from the process flow. A second fraction boiling from about 40° to an end point of from about 60 to about 70° C., consisting principally of $C_5$ hydrocarbons and which may comprise in addition to pentane, hexanes or heptanes (paraffins which are more volatile than benzene in the presence of the solvent) is removed from column 1 through line 8 and diverted into subsequent stages of the process as hereinafter described for use as the present reflux stream or displacing agent in the process flow. An intermediate boiling range fraction containing benzene and its azeotropes with other hydrocarbons present in the feed stock mixture, such as paraffins, naphthenes and/or olefins, and having an initial boiling point of from about 60° to about 70° C. and an end boiling point of from about 80° to about 90° C. is removed from column 1 as a side-cut through line 9 in amounts controlled by valve 10, and transferred into the extraction column by means of pump 11 which also compresses the fraction to the pressure desired in the subsequent extraction. A bottoms fraction of the original petroleum distillate comprising hydrocarbons boiling above the range selected for use as feed stock in the present separation process, generally above the boiling point of benzene and its azeotropes with other hydrocarbon components of the gasoline fraction, is withdrawn from column 1 through line 12 and valve 13 for diversion to storage or for further separation to recover toluene, the xylenes or other components, if desired.

The extraction stage of the present process is desirably effected at superatmospheric pressures, generally not in excess of about 15 atmospheres and at temperatures above the boiling point of the solute components dissolved in the rich solvent phase formed in the extraction column, preferably at temperatures of from about 50° to about 250° C. The reflux stream or raffinate displacing agent is charged into the bottom of the extraction column, or into an auxiliary column operated separately from the extraction column (not shown), at a rate sufficient to result in a final product of the desired purity, the latter purity factor being generally directly proportional to the volume ratio of displacing agent to extract phase contacted therewith, up to a definite value, which depends upon the particular feed stock and reflux compound utilized in the process. For most solvent extraction systems, a substantially pure product may be recovered utilizing a volume ratio of displacing agent to rich solvent of from about 0.01 to 1 to about 3 to 1, although this ratio may be varied within rather broad ranges, consistent with the volume capacity of the extraction column.

Referring again to the accompanying diagram, the feed stock in substantially liquid phase is withdrawn from fractionating column 1 as a sidecut through line 9 and valve 10, as aforesaid, compressed by means of pump 11 to a superatmospheric pressure within the range specified above as suitable for the operation of the extraction stage of the present process, and discharged therefrom into heat exchanger 14 wherein the liquid hydrocarbons are heated to the temperature at which the solvent extraction stage of the process is to be operated. The feed stock at this temperature and pressure is charged into solvent extraction column 15 at an intermediate point thereof between the extract outlet in the lower portion of the extraction column and the raffinate outlet in the upper portion of column 15 in order that countercurrent flow between the feed stock and solvent may be obtained within the column. The benzene-containing hydrocarbon mixture utilized as the feed stock in the process is countercurrently contacted within the column with an aqueous solution of oxy-diethylene glycol, containing for example, from about 5 to about 10% by weight of water. The solvent, being of greater specific gravity than the hydrocarbon feed stock, is introduced above the feed stock inlet to the column to flow downwardly in countercurrent flow relationship against the rising hydrocarbon stream, the solvent being admitted into the column through lean solvent recycle line 16. Extraction column 15 is a suitable arrangement of conventional liquid-liquid extraction equipment designed to intimately contact and mix two liquids at least partially immiscible with each other under countercurrent flow conditions and may be a tower containing a suitable packing material, such as berl saddles, etc. The column may alternatively be a bubble plate extraction column of well known design and fabrication.

In the illustrative case for purposes of the present description in which benzene is recovered from a petroleum fraction utilizing an aqueous diethylene glycol solution as extractant, the solvent becomes progressively enriched in benzene as it flows downwardly in the column to form a rich extract phase, and the hydrocarbon feed stock becomes leaner in benzene to form a raffinate phase comprising paraffinic, naphthenic and olefinic components (if any) present in the feed stock, the latter raffinate being removed from the top of the extraction column through a raffinate outlet port discharging into line 17 containing valve 18 which controls the raffinate withdrawal rate. As heretofore indicated, the preferred method of operating the present process comprises contacting under countercurrent flow conditions the rich solvent or extract phase formed in column 15 with a raffinate-type compound which is relatively volatile in the presence of the solvent with respect to the benzene component in the rich solvent phase, such that in the subsequent stripping operation, it may be separated from the rich solvent by single distillation of the rich solvent. The relatively volatile raffinate-type component when countercurrently contacted with the rich solvent prior to the distillation acts in the capacity of a displacing agent, displacing the less readily vaporized feed stock raffinate contaminants of the rich solvent phase. Although the displacing agent may be contacted with the rich solvent phase in an auxiliary column in which countercurrent flow between the liquid displacing agent and liquid rich solvent phase may be obtained, one of the preferred zones in which such contact may be made is in the lower portion of the extraction column, below the inlet port of the feed stock mixture into the extraction column. The rich solvent is thus contacted with the displacing agent just prior to removal of the rich solvent phase from the extraction column. The displacing agent charged into the lower portion of the extraction column as a reflux stream, is thereby allowed to flow upwardly through the column in intimate contact with the downwardly flowing extract phase. In the present benzene recovery process one of the most desirable raffinate-type displacing agents utilizable in the process is a lower molecular weight paraffinic hydrocarbon, such as normal or iso-pentane, a hexane isomer, a heptane isomer, or a mixture thereof. In the diagrammatic process, the volatile paraffin fraction comprising a mixture of pentanes and hexanes, boiling for example, from about 40° to about 70° C. and distilled from the hydroformed gasoline fraction in fractionating column 1 and removed therefrom through line 8 comprises a convenient source of such volatile raffinate-type displacing agent. This fraction is transferred through line 8 and valve 19 by means of pump 20 which also compresses the fraction to the desired operating pressure to be maintained in solvent extraction column 15 and is heated in heat exchanger 21 to the temperature at which the solvent extraction process is operated. This stream in liquid phase at the desired temperature and pressure is discharged from heater 21 through line 22 into the lower portion of column 15, preferably immediately above the rich solvent outlet port in the bottom of column 15. A portion of the light paraffin displacing agent may comprise the volatile fraction flashed from the rich solvent stream in the solvent stripping column, the flashed vapors being condensed and recycled as hereinafter described to the light paraffin inlet port in the lower portion of the extraction column, as aforesaid.

The extract or rich solvent stream comprising principally the aqueous glycol solvent and containing dissolved therein the extracted benzene component of the feed stock and a small amount of the volatile paraffin hydrocarbon displacing agent is removed from the bottom of extraction column 15 through line 23 in amounts controlled by valve 24 and is transferred by means of pump 25 into the upper portion of solvent stripping column 26 wherein the extracted hydrocarbon solute components of the rich solvent stream are vaporized from the solvent to form a lean solvent residue comprising the glycol solvent which is recycled to the extraction column and a benzene fraction as the ultimate product of the process.

The stripping column is essentially a distillation zone containing at least two solute vaporizing sections operated at different pressures, at least one of the upper sections of which is operated at a higher pressure than one or more lower sections thereof and which, in addition, is vapor-sealed from the other sections. A preferred form of the rich-solvent stripping zone comprises a vertical column containing three distinct sections operating at different pressures, that is, an uppermost primary flashing section in which the pressure is reduced partially from the pressure maintained on the rich solvent stream entering the stripping zone, a lower or intermediate secondary flashing or vaporizing section in which the pressure is maintained at a somewhat lower level than the pressure maintained in the primary flashing section, usually at atmospheric pressure, and a lowermost stripping section, vapor-sealed from the upper sections of the column wherein the pressure is the same as or higher than the pressure maintained in the secondary flashing section and wherein true stripping of the rich solvent is obtained. When the solvent extraction stage of the process is operated at a superatmospheric pressure, the secondary flashing section may be maintained at atmospheric or at a somewhat lower pressure and preferably at barometric pressure in order to accomplish a step-wise pressure reduction from the pressure level maintained on the solvent during extraction to the pressure level maintained in the stripping section, thereby obtaining the advantage of flash vaporization of the solute components from the rich solvent stream in both sections without the application of extraneous heat in any substantial amount on the rich solvent stream. In the operation of the extraction column as indicated wherein the rich solvent is contacted prior to the stripping stage of the process, with a relatively volatile displacing agent under conditions whereby the latter dissolves in part in the solvent to make up a portion of the solute in the rich solvent, the most volatile component of the rich solvent stream will be the displacing agent or reflux hydrocarbon, which in the diagrammatic process is the predominantly $C_5$ paraffinic hydrocarbon displacing agent or reflux stream. In the operation of the stripping column a portion of the volatile displacing agent together with a portion of the water and benzene components of the rich solvent stream, are flashed from the rich solvent charged to the stripping zone in the upper or primary flashing section of the stripping column, taking overhead a light fraction. The light paraffins are flashed overhead by virtue of being more volatile (even though of higher molecular weight than benzene) in the presence of the solvent than the benzene component of the rich solvent. The stripping column is equipped in the lower portion thereof with a reboiler coil through which heat is introduced into the rich solvent residue to completely vaporize the volatile hydrocarbon solute components from the rich solvent charged to the stripping column. In addition to or in place of a portion of the heat introduced into the stripping column via the reboiler coil, a hot vapor of a suitable stripping agent may be injected into the lower portion of the stripping column to volatilize or strip the last traces of solute component from the rich solvent residue. When water is utilized as a secondary solvent component of the present selective solvent composition, steam may be injected into the stripping column as the stripping agent and for the additional purpose of rehydrating the solvent to its selective solvent composition, suitable for immediate recycling to the extraction column as the solvent-extractant therein. In accordance with the usual methods of operating the stripping column, the latter is maintained in equilibrium by charging the feed stock and solvent at constant rates, irrespective of the concentration of product in the feed stock and relying upon the reserve capacity of the solvent to remove any additional product in the feed stock if the composition of the latter changes during operation of the process. Furthermore, in order to realize equilibrium operation of the process, the heat input, and the withdrawal rates of sidecuts are varied with variations in feed stock composition to completely remove all solute hydrocarbon components from the rich solvent for recycling to the extraction zone. In order to recover a substantially pure benzene product from the process, the withdrawal rate of product from the stripping zone is maintained at a constant level, determined by the solvent charging rate and a predetermined minimum concentration of benzene in the feed stock. Any increases in the amount of benzene contained in the feed stock is reflected in the benzene content of the overhead fraction from the stripping column, the withdrawal rate of sidecut benzene from a lower plate of the stripping column being thereafter increased to reduce the benzene recycled in the overhead fraction. When the benzene concentration in the feed stock again falls to its predetermined minimum, the rate of side-cut withdrawal is again reduced in response to a reduced benzene concentration in the overhead fraction from the stripping column as indicated by analysis of the overhead stream. It is to be noted, however, that in the period between adjustment of the side-cut withdrawal rate to accommodate varying benzene concentration in the feed stock, as indicated by periodic analysis of the overhead fraction for benzene, in accordance with method heretofore employed in the operation of such stripping columns, the amount of benzene distilling overhead from the stripping column with the light paraffin reflux may be substantial and may increase excessively the benzene inventory in the process when the light overhead fraction is recycled to the extractor. An increase in the benzene inventory likewise increases the amount of heat required to vaporize solute from the rich solvent and places an undue heating load on the reboiling section of the stripping zone to vaporize all of the solute from the rich solvent stream. It has also been found that for substantially all solvents and solvent combinations employed in solvent extraction, the amount of light paraffin reflux component which will dissolve in the rich solvent stream is independent of the feed stock composition charged to the extraction column and the amount of light paraffins in the overhead vapors from the stripping column is likewise constant, leaving only the benzene content of the overhead vapors as a variable when the feed stock composition varies. Thus, in the recovery of benzene from a hydrocarbon fraction containing paraffinic hydrocarbons, where in a $C_5$ and/or $C_6$ paraffin displacing agent is contacted with the rich solvent stream prior to the stripping operation, the amount of $C_5$ and/or $C_6$ paraffins which dissolve in the rich solvent stream is substantially independent of the concentration of benzene in the feed stock, and irrespective of the amount of benzene which dissolves in the rich solvent stream. The physical volume of the overhead fraction from the stripping column, comprising the light paraffin displacing agent or reflux dissolved in the rich solvent, which under conditions of constant feed composition would normally be maintained at a constant withdrawal rate, increases, however, when the concentration of the benzene component in the feed stock increases. As the benzene product fraction is withdrawn from the stripping column at a constant rate previously set for a feed stock containing a specific minimum concentration of benzene therein, the withdrawal rate of the light overhead fraction must of necessity increase in order to accommodate a greater concentration of solute in the rich solvent charged to the stripping column, resulting in a greater proportion of the product being withdrawn from the column in the overhead stream which is recycled directly to the extractor. In accordance with the prior art method of operating the stripping column the time required for analysis of the overhead stream to determine the concentration of benzene component therein generally causes an appreciable delay in adjusting the withdrawal rate of the benzene product stream to reduce the recycle rate of benzene through the overhead vapor stream to the extractor and a large quantity of benzene may be unnecessarily recycled.

The present invention provides a means for automatically and instantaneously adjusting the operation of the stripping column by the interaction of suitable flow control means on the product withdrawal line in response to flow sensing means in the overhead vapor line to thereby accommodate variations in the concentration of product component (benzene) in the feed stock. By means of the present flow control arrangement on the product withdrawal rate, the usual high inventory recycle of product in the process flow arising from a variation in the feed stock composition is eliminated without variation in the charging rate of solvent to the extraction stage or excessive consumption of utilities required in the reboiling section of the stripping column.

Referring to the accompanying diagram, the rich solvent stream formed in solvent extraction column 15 and removed from the bottom thereof through line 23 is transferred by means of pump 25 into the upper portion of solvent stripping column 26. As previously indicated, the rich solvent stream is preferably charged into the solvent stripping column at a superatmospheric pressure and at a temperature above the boiling points of the hydrocarbon solute components dissolved in the rich solvent stream, thereby obtaining flash vaporization of the solute components when the rich solvent stream in liquid phase is introduced into the stripping column 26 maintained at a lower pressure than the pressure on the rich solvent stream. A preferred method of stripping the hydrocarbon solute components from the rich solvent stream such as the $C_5$ and/or $C_6$ paraffins and benzene components in the present operation is to effect the stripping by a stepwise reduction in pressure in separate sections of the stripping column. Under a further alternative method of obtaining flash vaporization the rich solvent may be introduced into stripping column 26 at substantially atmospheric pressure and the solute components flashed therefrom in aliquot fractions, based upon the boiling points of the individual solute components by stepwise reduction in the ambient pressure to subatmospheric levels in the separate sections of the stripping column. Whether solvent extraction column 15 is operated at atmospheric or at a superatmospheric pressure, the rich solvent stream is charged in controlled amounts through valve 27 into an uppermost primary flashing section, illustrated on the accompanying diagram as zone A maintained at a lesser pressure than the pressure on the rich solvent stream. Section A is an enclosed chamber hermetically sealed from the lower portion of the stripping column, for example by tray 28 which prevents the escape of vapors and the uncontrolled flow of liquid from zone A into the lower portions of the column. Since the rich solvent is introduced into zone A in liquid form at a temperature above the boiling point of at least the most volatile solute component of the rich solvent, that is, the light paraffinic hydrocarbon displacing agent which is more volatile because it is distilled from a solution in the solvent, at least a major proportion of the volatile paraffins are flashed in zone A at the reduced pressure maintained therein. Because the other volatile solute components of the rich solvent stream also exert a partial pressure, the vapors flashed from the rich solvent are also made up of a portion of the benzene component dissolved in the rich solvent and a portion of the water comprising the selective solvent. The resulting mixed vapors are taken overhead from the column through line 29 and valve 30. The vapors thus formed are transferred, together with other volatile component vapors derived as hereinafter described, into a common conduit therefor.

The rich solvent residue from which at least a portion of the solute components of greatest volatility have been removed in the primary flashing section is transferred in liquid form from the bottom of tray 28 in zone A into line 31 in amounts controlled by valve 32 which opens and closes in response to a liquid level control 33 connected to the primary flashing section A, the co-action of the level control 33 and valve 32 maintaining a substantially constant level of rich solvent in zone A at all times during the operation of the stripping column. When the liquid level of the rich solvent in zone A exceeds a predetermined desired maximum as maintained by the level control device, valve 32 opens and permits the rich solvent residue resulting from the primary flashing to drain out tray 38 in secondary flashing section or zone B of the stripping column wherein the pressure on the solvent is maintained at a lower level than the pressure maintained in zone A, as for example, at atmospheric pressure or at a superatmospheric pressure less than in zone A. Secondary flashing or vaporizing section B is an enclosure bounded by tray 28 above it and the layer rich solvent residue accumulating on tray 38. Since the flash distillation obtained in zone A occurs as the result of pressure reduction at a constant temperature, the rich solvent residue introduced into zone B is at substantially the same temperature as the rich solvent in zone A and further reduction in pressure in zone B causes an additional flashing of the volatile solute components present in the rich solvent stream. Vapors of the volatilized solute components comprising an additional increment of dissolved $C_5$ and/or $C_6$ paraffins, benzene and water are removed from zone B through line 34 and valve 35, line 34 desirably connecting with line 29 which transfers the vapors into a common conduit for the various vapor streams of volatile solute, hereinafter described.

Instead of a two-stage flashing operation in two separated upper zones of the stripping column, the reduction in pressure on the rich solvent stream may be accomplished in a single stage and primary flashing section A may be combined with secondary flashing section B as a single flashing zone under an alternative means of operating the stripping column. Thus, one of the flashing sections, either primary flashing section A or secondary flashing section B, may be eliminated by diverting the rich solvent stream in liquid phase and at a superatmospheric pressure from line 25 into line 36 containing valve 37, line 36 connecting with line 31 which introduces the rich solvent stream into zone B, which under such modified flow can be considered the primary flashing section. The pressure in such an alternative mode of operation is reduced in one step from the pressure maintained on the solvent in extraction zone 15 to the pressure maintained in the remaining portions of the stripping column, as for example, at atmospheric pressure.

The secondary rich solvent residue accumulating on tray 38 in secondary flashing section B from which a portion of the volatile solute components is removed as a vapor through line 34 is allowed to flow into lower stripping zones of column 26, preferably through a vertical standpipe 39 depending from tray 38 and terminating at its lower end in a liquid well 40, the lower end of the standpipe being immersed below the surface of the liquid rich solvent residue accumulating in well 40, thereby sealing section B from vapor generated in the lower stripping zone of the column. Tray 38, together with its downcomer conduit 39 attached to the bottom of the tray functions as a blind tray in collecting the liquid rich solvent residue and provides a liquid surface from which the volatile solute components may be vaporized. The rich solvent residue from secondary flashing section B fills the liquid well 40 defined by a wall rising from tray 31 and spills over the wall onto tray or plate 41, the uppermost tray in the stripping section C. The space above tray 41 provides a vaporization zone from which the remaining relatively volatile $C_5$—$C_6$ paraffin hydrocarbon displacing agent, together with a small amount of water and benzene components of the rich solvent stream are removed from the rich solvent residue accumulating on tray 41. The height of the liquid maintained in the rich solvent well 40 is sufficient to prevent the escape of vapor generated in the stripping section C into the secondary flashing section B by virtue of the standpipe having its lower end immersed sufficiently below the surface of the liquid maintained in the well to seal the open end of the standpipe from vapors generated in the stripping section "C" of the column, as hot vapors of the volatile solute components generated in the lower portion of distillation column 26 rise into the vapor space above plate 41. Thus, in the case of recovering benzene from an aqueous glycol rich solvent stream in which the volatile paraffinic displacing agent is also dissolved, the vapors entering the upper plate of the stripping section are a mixture of benzene, steam and volatile paraffins, the quantity of benzene in these vapors being dependent upon the concentration of benzene in the feed stock supplied to the solvent extraction zone. These vapors are removed from the column through line 42 which joins the vapor overhead line 29 and mixes therein the two streams of volatile solute components recovered as overhead vapors from stripping column 26. The combined vapors flow into condenser 43 operated at a sufficiently low temperature to liquefy the stream of volatile overhead vapors into a liquid condensate which flows from condenser 43 via line 44 into receiver vessel 45 wherein the condensed water vapor of the volatile overhead stream is allowed to separate from an upper hydrocarbon layer by stratification. The hydrocarbon layer in vessel 45, consisting of a mixture of the $C_5$ and/or $C_6$ paraffin hydrocarbon displacing agent and a small quantity of benzene carried over in the vapor overhead from the stripping column is withdrawn from vessel 45 through line 46 and valve 47 and transferred by means of pump 48 into line 49 connecting with line 8 which recycles the paraffinic and aromatic hydrocarbons contained in this overhead stream into the bottom of solvent extraction column 15 after being compressed in pump 20 and heated in heat exchanger 21 to the temperature and pressure at which column 15 is operated. In thus recycling the hydrocarbons contained in the light vapor overhead from stripping zone 26 to the bottom of extraction column 15 the volume of displacing agent charged into the extraction zone is increased, resulting in a greater net displacement of feed stock raffinate hydrocarbons from the extract stream and the production of a resulting benzene product of greater purity. Furthermore, the recycling of this vapor overhead stream normally containing a relativeley large proportion of benzene therein as a reflux stream to the solvent extraction zone also provides a means of recovering the benzene component of the light vapor overhead.

The amount of benzene in the vapor overhead from the stripping zone is, in general, dependent upon the benzene concentration of the feed stock when the stripping column is operated in accordance with the usual method of the prior art, since the rate of withdrawal of benzene product from the lower plate of the stripping column is ordinarily maintained at a constant rate, corresponding to a minimum anticipated concentration of benzene in the feed stock in order to permit the rich solvent stripping column to operate under equilibrium conditions. Under the present modified method of operating the stripping column by the means involving the essential features of the present invention, the rate of withdrawal of the benzene product from the lower plate of the stripping column varies in accordance with the benzene concentration of the feed stock, the product withdrawal rate being automatically controlled directly and instantaneously as the feed stock composition varies by means of a flow control device 50, such as a valve in the benzene withdrawal conduit 51 through which the benzene product is withdrawn as a sidecut from an intermediate plate in the stripping section of column 26, such as plate 52. This method of control is based upon the fact that the total quantity of paraffinic hydrocarbons in the light vapor overhead is a constant value, independent of the concentration of aromatic component in the feed stock supplied to extraction zone 15, the paraffins dissolving to the same extent in the solvent regardless of the composition of the feed stock. The quantity of light vapors, therefore, removed from the upper plate of the stripping section (through line 42), is therefore constant, irrespective of the benzene concentration in the feed stock. When the benzene concentration in the feed increases, however, the volume of light overhead vapors removed through line 42 increases in order to accommodate the larger quantity of solute in the rich solvent stream, which must be removed therefrom before the rich solvent residue (lean solvent) is recycled to the extraction column. In accordance with the methods heretofore employed for operating the stripping column, the undue quantity of benzene removed from the column in the light overhead fraction is not detected until analysis is made of the light vapor overhead condensate, an analysis which requires a considerable lag in time, during which time the benzene product in the overhead stream is recycled in the process flow through line 46. If the time lag is sufficient, the additional recycled benzene overloads the solvent and the recycled benzene is lost in the raffinate effluent of the extractor. In accordance with the present process, the flow rate of benzene from the withdrawal conduit 51 is instantaneously increased when the flow rate of light overhead through line 42 increases as a result of an increase in the benzene concentration of the feed stock. One of the preferred methods of regulating the flow control means 50 in response to an increase in the flow of vapor through line 42 is by means of an orifice-type flow meter in line 42, such as orifice flange 53 which actuates flow control device 54, the latter transmitting a pressure impulse to valve 50 which opens or closes in response to variations in the pressure on valve actuating means 55 forming a part of valve 50. Thus, when the rich solvent supplied to column 26 contains a larger proportion of benzene in the solute component of the rich solvent, as a result of an increase in the benzene concentration in the feed stock, the amount of vapor removed through line 42 increases and depresses the pressure in line 53a which connects the orifice meter with a flow control means 54. The latter flow control means transfers an impulse via line 54a to a membrane in valve actuating means 55 which opens valve 50 and allows the removal of benzene from plate 52 through line 51 at a greater rate. The removal of a greater quantity of benzene through line 51 simultaneously reduces the quantity of vapor removed through light vapor overhead line 42. This overhead fraction is desirably limited in quantity to that which includes all of the paraffinic hydrocarbon displacing agent present in the rich solvent and a minimum of the benzene and water components of the rich solvent vaporized with the light paraffins. The device of the present invention, therefore, maintains the quantity of light vapor overhead removed through line 42 at a constant value independent of the benzene concentration in the feed stock supplied to solvent extraction zone 15 and adjusts the benzene withdrawal rate through line 51 to accommodate such increase in benzene concentration of the feed stock.

The benzene and water vapors removed from plate 52, an intermediate tray in stripping section C of the column is liquefied in condenser 56 into a mixture of water and benzene which is removed therefrom through line 57 and collected in receiver vessel 58. The mixture of water and benzene accumulating in receiver vessel 58 stratifies as a two-layer system, the upper layer consisting of substantially pure benzene which is removed from vessel 58 through line 59 in amounts controlled by valve 60 in said line 59. The benzene product in the present process is a substantially pure product of nitration grade quality, containing at least 99.5% benzene.

The lower aqueous layers in receiver vessels 45 and 58 are withdrawn therefrom through lines 61 and 62 respectively containing valves 63 and 64 respectively, line 62 connecting with line 61 to combine the aqueous streams for recycling in the present flow. In the preferred method of operating the stripping column, the water vaporized from the rich solvent stream in solvent stripping column 26 is returned to the latter column as steam, which is desirably superheated for the purpose of vaporizing the volatile solute components of the rich solvent stream and to rehydrate the glycol lean solvent residue accumulating in the lower portion of distillation column 26. For this purpose, the aqueous layers recovered from the various sidecuts of the stripping column are recycled to the bottom of the stripping column through line 61 containing heater 65 which vaporizes the water and superheats the steam, if desired. The steam formed in heater 65 is discharged therefrom into line 66 which leads into the lower portion of solvent stripping column 26 where the lean solvent (that is, the stripped rich solvent stream) is contacted with the steam and intimately mixed therewith. Any volatile hydrocarbon components which may remain in the lean solvent at this point are stripped therefrom due to the increase in their vapor pressure as a result of water dissolving in the glycol. The resulting steam and hydrocarbon vapors ascend the lower portion of the stripping column and are withdrawn at least in part from tray 52 through the benzene sidecut withdrawal line 51. The total heat requirement to effect complete stripping of the rich solvent residue or lean solvent in the lower portion of stripping column 26 may thus be supplied by virtue of the latent and sensible heat in the stripping steam, but generally additional heating is required in order to effect the removal of the last traces of benzene from the solvent residue. For this purpose, stripping column 26 is ordinarily equipped with a reboiler coil 67 through which a hot fluid, heated in heater 68, is circulated, the hot fluid releasing its heat to the solvent residue in the lower portion of column 26, thereby vaporizing the last traces of benzene component from the rich solvent stream. The amount of heat supplied through the reboiler and the re-circulation rate of steam into the bottom of the stripping column are mutually adjusted to result in a lean solvent in the bottom of column 26 containing the desired quantity of water corresponding to the selective solvent composition suitable for use as the extractant in solvent extraction column 15.

The lean solvent is removed from the bottom of column 26 through line 69 and valve 70 and is suitable for immediate recycling to the solvent extraction column, the solvent being transferred by means of pump 71 and heated or cooled by means of heat exchanger 72 to the temperature and pressure at which extraction column 15 is operated. The amount of heat introduced through the reboiler coil 67 is also desirably controlled to produce a lean solvent residue which is approximately at the desired temperature at which extraction column 15 is operated such that the heating or cooling duty of heat exchanger 72 is merely nominal. The lean solvent at the desired temperature and pressure is discharged from heat exchanger 72 into solvent charging line 16 to the extraction zone. In the event that the water content of the solvent is not sufficient to provide the present selective solvent composition, additional water may be introduced into the process flow through line 73 in controlled amounts determined by valve 74 to hydrate the lean solvent to the desired water content.

I claim as my invention:

1. A combination solvent extraction-rich solvent stripping process which comprises contacting an oxygen-containing organic solvent under solvent extraction conditions with a feed stock mixture comprising organic compounds of class A and of class B, said class A compound being relatively more soluble in said solvent than said class B compound, forming thereby a raffinate comprising said class B compound and an extract comprising said oxygen-containing organic solvent, said class A compound and a small proportion of class B raffinate compound, thereafter contacting said extract with a volatile class B compound of lower boiling point than said solvent and the class B compound in said feed stock mixture thereby effecting a displacement of the latter class B compound from said extract, subjecting the resulting extract to distillation, separately withdrawing from said distillation a light vapor fraction containing lower boiling class B compound, an intermediate fraction comprising essentially said class A compound and a heavy fraction comprising essentially said solvent, and maintaining the rate of withdrawal of said light vapor fraction substantially constant by instantaneously varying the rate of withdrawal of said intermediate fraction in direct response to change in the rate of withdrawal of said light vapor fraction.

2. The process of claim 1 further characterized in that said class A compound is an aromatic hydrocarbon and said volatile class B compound is a paraffinic hydrocarbon.

3. The process of claim 2 further characterized in that said aromatic hydrocarbon is benzene and said paraffinic hydrocarbon is a hydrocarbon selected from the group consisting of the $C_5$, $C_6$ and $C_7$ paraffins.

4. A process for separating and recovering the solute components of a rich solvent formed in a preceding solvent extraction zone by vaporizing said solute components in a distillation zone comprising a combination of an upper flashing section in which a volatile paraffinic solute component is flashed from said rich solvent supplied thereto, a vaporizing section below said flashing section from which a higher boiling fraction is removed, and a stripping section below said vaporizing section in which an aromatic solute component less volatile than the first-mentioned solute component is stripped from said rich solvent, said process comprising introducing said rich solvent at an elevated temperature in excess of the boiling point of at least the paraffinic volatile solute component into said flashing section, withdrawing a vapor comprising a portion of said paraffinic solute component, introducing a resulting first rich solvent residue into said vaporizing section maintained at a lower pressure than said flashing section, withdrawing vapor from said vaporizing section, introducing a resulting second rich solvent residue into the upper portion of said stripping section, heating the rich solvent residue in the lower portion of said stripping section, said upper portion being vapor-sealed from said vaporizing section, withdrawing vapors of another portion of said paraffinic solute component from the upper portion of said stripping section, withdrawing vapors of said less volatile aromatic solute component from an intermediate portion of said stripping section, and maintaining the rate of paraffinic vapor withdrawal from the upper portion of said stripping section substantially constant by instantaneously varying the rate of aromatic vapor withdrawal from said intermediate portion of the stripping section in direct response to changes in the rate of withdrawal of said paraffinic vapor.

5. The process of claim 4 further characterized in that said flashing section is maintained at a superatmospheric pressure and said stripping section is maintained at substantially atmospheric pressure.

6. The process of claim 4 further characterized in that said paraffinic solute component is a $C_5$ paraffin and said aromatic component is benzene.

7. A process for recovering a more volatile paraffinic solute and a less volatile aromatic solute from a rich solvent containing the same, which comprises introducing the rich solvent to the upper portion of a stripping zone, heating the lower portion of said zone sufficiently to vaporize said solutes from the solvent, removing vapors of said more volatile paraffinic solute from the upper portion of the stripping zone, removing less volatile aromatic solute from an intermediate portion of said zone and lean solvent from the lower portion thereof, and maintaining the rate of paraffinic vapor withdrawal from the upper portion of said zone substantially constant by instantaneously varying the rate of withdrawal of said less volatile aromatic solute from the intermediate portion of said zone in direct response to changes in the rate of withdrawal of said paraffinic vapor from the upper portion of the stripping zone.

References Cited in the file of this patent

UNITED STATES PATENTS

| | | |
|---|---|---|
| 2,246,934 | Denney | June 24, 1941 |
| 2,414,371 | Fragen et al. | Jan. 14, 1947 |
| 2,417,669 | Vinyard | Mar. 18, 1947 |
| 2,613,174 | Ockert | Oct. 7, 1952 |
| 2,633,448 | Neuworth | Mar. 31, 1953 |